US012497028B1

(12) United States Patent
Crego et al.

(10) Patent No.: US 12,497,028 B1
(45) Date of Patent: Dec. 16, 2025

(54) AUTONOMOUS VEHICLE FAULT INJECTION TESTING

(71) Applicant: Zoox, Inc., Foster City, CA (US)

(72) Inventors: Andrew Scott Crego, Foster City, CA (US); David Martins Belo, San Francisco, CA (US); Thomas Joseph Burrow, Palo Alto, CA (US); Bala Sai Varma Gottumukkala, Hyderabad (IN); Elaine Hoyen Kwan, San Francisco, CA (US); John Douglas Logan, San Mateo, CA (US); Michael Isaac Mizrahi, San Mateo, CA (US); Dhrumil Parikh, Sunnyvale, CA (US); Tushar Shishpal Rawat, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 912 days.

(21) Appl. No.: 17/327,723

(22) Filed: May 23, 2021

(51) Int. Cl.
*B60W 30/09* (2012.01)
*B60W 60/00* (2020.01)
*G07C 5/08* (2006.01)
*G09B 9/042* (2006.01)

(52) U.S. Cl.
CPC .......... *B60W 30/09* (2013.01); *B60W 60/001* (2020.02); *G07C 5/0816* (2013.01); *G09B 9/042* (2013.01); *B60W 2510/18* (2013.01)

(58) Field of Classification Search
CPC .............. B60W 30/09; B60W 60/001; B60W 2510/18; G07C 5/0816
See application file for complete search history.

(56) References Cited

U.S. PATENT DOCUMENTS

| 6,345,603 | B1 * | 2/2002 | Abboud | F02D 11/107 |
| | | | | 123/399 |
| 9,195,232 | B1 * | 11/2015 | Egnor | B60W 10/20 |
| 9,720,415 | B2 * | 8/2017 | Levinson | G05D 1/0257 |
| 10,395,441 | B2 * | 8/2019 | Poeppel | B60T 7/18 |
| 10,482,003 | B1 * | 11/2019 | Bondor | G06F 11/3684 |
| 10,513,161 | B2 * | 12/2019 | Anderson | B60N 2/0273 |
| 10,852,721 | B1 * | 12/2020 | Smith | G06F 11/3684 |

(Continued)

OTHER PUBLICATIONS

Joshi, Hardware-In-the-Loop Implementation And Validation of SAE Level 2 Automated Vehicle with Subsystem Fault Tolerant Fallback Performance for Takeover Scenarios, 2018, SAE International Journal of Connected and Automated Vehicles (Year: 2018).*

*Primary Examiner* — Iftekhar A Khan
(74) *Attorney, Agent, or Firm* — Lee & Hayes, P.C.

(57) ABSTRACT

Techniques for fault injection testing are described herein. The techniques may include receiving, at a computing device, an indication to simulate a fault associated with a component of a vehicle. The computing device may be coupled to the component via a control line that includes a relay or switch component that, when activated, causes the component to simulate the fault. The computing device may also receive data indicative of a vehicle response, such as a measured trajectory of the vehicle in response to the fault, whether a backup system of the vehicle performed correctly in response to the fault, whether the vehicle responded to the fault within a threshold period of time, and the like. The computing device may determine a difference between the vehicle response and an intended response of the vehicle relative to a threshold difference.

20 Claims, 5 Drawing Sheets

(56) References Cited

U.S. PATENT DOCUMENTS

| | | | | |
|---|---|---|---|---|
| 11,022,971 | B2* | 6/2021 | Della Penna | G08G 1/0129 |
| 11,086,318 | B1* | 8/2021 | Davis | G05D 1/0212 |
| 11,150,660 | B1* | 10/2021 | Kabirzadeh | G06F 30/15 |
| 11,214,271 | B1* | 1/2022 | Gunaratne | B60W 60/00186 |
| 11,332,158 | B2* | 5/2022 | Hecker | B60W 50/029 |
| 11,415,997 | B1* | 8/2022 | Dolan | G06F 11/3688 |
| 12,008,922 | B2* | 6/2024 | Palmer | B60W 50/14 |
| 12,013,693 | B1* | 6/2024 | Chan | G05D 1/0289 |
| 2006/0178792 | A1* | 8/2006 | Ortiz | G05B 23/0283 701/29.1 |
| 2015/0012166 | A1* | 1/2015 | Hauler | B60W 50/023 701/23 |
| 2015/0371461 | A1* | 12/2015 | Treharne | G07C 5/0833 701/31.4 |
| 2016/0009235 | A1* | 1/2016 | Joyce | B60R 16/0232 701/24 |
| 2016/0314224 | A1* | 10/2016 | Wei | G05D 1/0088 |
| 2016/0368491 | A1* | 12/2016 | Hauler | B60T 7/22 |
| 2017/0023945 | A1* | 1/2017 | Cavalcanti | H05B 47/19 |
| 2017/0132334 | A1* | 5/2017 | Levinson | B60W 50/00 |
| 2017/0136842 | A1* | 5/2017 | Anderson | B60G 17/016 |
| 2018/0089563 | A1* | 3/2018 | Redding | G06N 5/01 |
| 2019/0079194 | A1* | 3/2019 | Kuffner | G08G 1/166 |
| 2019/0079513 | A1* | 3/2019 | Greenfield | G06F 11/20 |
| 2019/0129831 | A1* | 5/2019 | Goldberg | G06F 11/3698 |
| 2019/0161080 | A1* | 5/2019 | Gochev | G08G 1/165 |
| 2019/0259292 | A1* | 8/2019 | Williams | G06F 18/24323 |
| 2019/0278290 | A1* | 9/2019 | Zhang | G01S 7/40 |
| 2020/0086855 | A1* | 3/2020 | Packer | G05D 1/0289 |
| 2020/0134494 | A1* | 4/2020 | Venkatadri | G06N 3/045 |
| 2020/0207339 | A1* | 7/2020 | Neil | G06V 20/58 |
| 2020/0249674 | A1* | 8/2020 | Dally | G05D 1/0221 |
| 2020/0294401 | A1* | 9/2020 | Kerecsen | G08G 1/205 |
| 2021/0010902 | A1* | 1/2021 | Breton | B60T 8/885 |
| 2021/0096571 | A1* | 4/2021 | Modalavalasa | G07C 5/0816 |
| 2021/0165932 | A1* | 6/2021 | Mohan | G06F 11/3698 |
| 2021/0201145 | A1* | 7/2021 | Pham | G06N 3/08 |
| 2021/0286925 | A1* | 9/2021 | Wyrwas | G06N 3/084 |
| 2021/0370980 | A1* | 12/2021 | Ramamoorthy | G06N 20/00 |
| 2022/0026921 | A1* | 1/2022 | Halder | B60W 60/00 |
| 2022/0262173 | A1* | 8/2022 | Wu | G06Q 10/20 |
| 2022/0270057 | A1* | 8/2022 | Wu | G06Q 50/40 |
| 2022/0406192 | A1* | 12/2022 | Butler | B62D 6/00 |
| 2023/0053459 | A1* | 2/2023 | You | G06V 10/765 |
| 2024/0051574 | A1* | 2/2024 | Lee | G08G 1/0129 |

* cited by examiner

AUTONOMOUS VEHICLE FAULT INJECTION TESTING

BACKGROUND

Simulations can be used to test and validate functionality of vehicle systems and components, which could be otherwise prohibitive to test in the real-world (e.g., due to safety concerns, limitations on time, repeatability, etc.). However, existing simulation techniques are typically limited to verifying operation of individual vehicle components and/or systems. This can make it difficult to verify whether the entire vehicle is operating properly.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
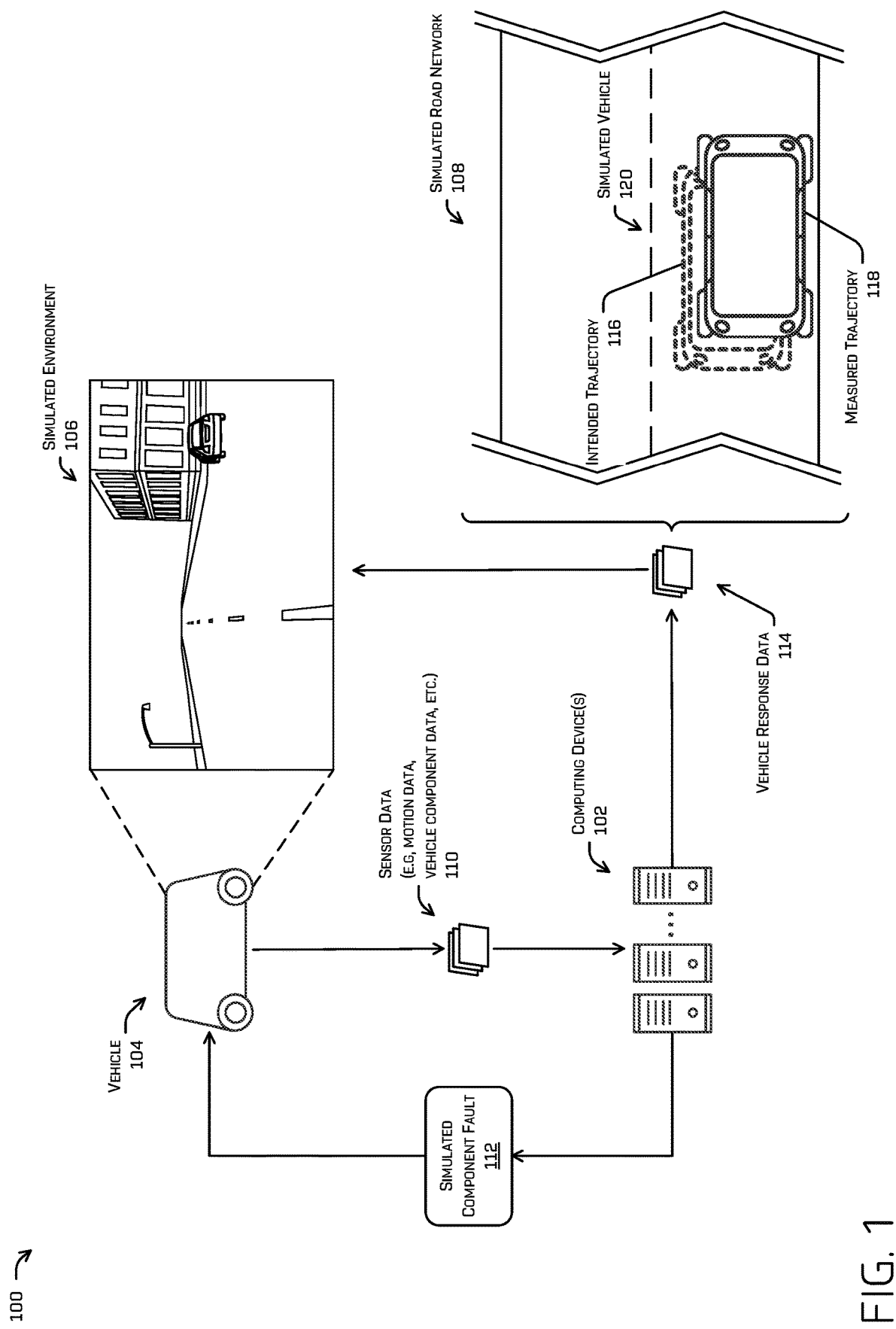
FIG. 1 illustrates an example data flow that is associated with simulating a fault of a vehicle component according to some of the techniques described herein.

Techniques for testing faults associated with a vehicle are discussed herein. For example, this application relates to techniques for, among other things, simulating faults and/or errors of vehicle components such that a response of the vehicle, as a whole, to the faults and/or errors can be determined, including, for example, with respect to hardware-in-the-loop simulations. As described above, simulations can be used to test and validate functionality of vehicle systems and components, which could be otherwise prohibitive to test in the real-world (e.g., due to safety concerns, limitations on time, repeatability, etc.). However, existing simulation techniques are typically limited to verifying operation of individual vehicle components and/or systems. This can make it difficult to verify whether the entire system (e.g., a vehicle) is operating properly. Accordingly, this disclosure describes techniques for performing vehicle simulations by injecting or otherwise introducing faults into one or more components or systems of the vehicle such that an entire response of the vehicle may be determined (e.g., whether the vehicle performed a safe stopping maneuver in response to the fault, whether another component or system activated to compensate for the faulty component or system to return the vehicle to a safe state, etc.).

In some instances, and as described herein, the techniques of this application may be used to verify proper operation of autonomous vehicle systems. As an example, some of the simulation techniques described herein include "fault injection tests" to determine how an autonomous vehicle responds when, for instance, an incorrect or corrupted Controller Area Network (CAN) signal is received, a CAN signal or message is dropped, an electronic control unit (ECU) of the autonomous vehicle loses power, experiences a short circuit, and/or the like. These fault injection tests may be used to determine/verify how all of the autonomous vehicle systems, as a whole, work together to bring the autonomous vehicle to a safe state in response to an injected fault, instead of just determining what one system, subsystem, or component of the autonomous vehicle will do if a fault and/or error is experienced. In this way, the techniques described herein provide more realistic simulations and/or responses to vehicle dynamics systems, similar to what a vehicle would experience in a real-world failure event.

Take, for example, a situation in which a steering system failure of an autonomous vehicle is to be simulated, and a system requirement of the autonomous vehicle during the steering failure is for the autonomous vehicle to experience less than a threshold amount (e.g., one meter, two meters, three meters, etc.) of lateral deviation. As further described herein, a drivetrain component of the autonomous vehicle may be coupled to a dynamometer during the simulation to observe the actual, physical behavior of the autonomous vehicle in response to the fault. For instance, the steering system may include a first ECU and a second, redundant ECU. In various examples, the steering system may be controlled in whole or in part by the first ECU under normal operation and, if a failover event is triggered (e.g., a fault or error associated with the first ECU is experienced), the second ECU may be used to control operation of the steering system by performing the operations previously performed by the first ECU. In this way, if a simulated fault associated with the first ECU is injected into the steering system, the second ECU may take over control of the steering system. By using the techniques described herein, however, more than just the behavior of whether the steering system ECUs properly failed over may be observed. Instead, the behavior of the autonomous vehicle as a whole may be tested (e.g., verifying that the lateral deviation did not exceed the threshold amount) based on data received from the dynamometer.

In some examples, a simulation system for performing the techniques described above and herein may include a computing device (e.g., simulation or test controller) that is communicatively coupled to various components of the vehicle (e.g., motors, brakes, controllers, computing devices, and the like) via control lines. The control lines may include relay or switching components that allow the control lines to be disconnected from their respective component(s). In this way, a faulty signal may be injected into the vehicle system as a simulated error of the component without the need to change the underlying software running on the vehicle for testing the particular fault. In some cases, the motors and/or drivetrain components of the motors (e.g., wheels, drivelines, etc.) may be coupled to a dynamometer (or "dyno") to measure an output of the motors such that vehicle dynamics may be determined. In this way, simulated faults and errors can be injected into the vehicle such that the vehicle response can be determined.

Among other things, the techniques described in this disclosure improve the operation of vehicles by enabling real-world simulations to verify vehicle operations when a fault is experienced. As described above, existing simulation and fault injection techniques are typically limited to verifying operation of individual vehicle components and/or systems. This can make it difficult to verify whether the entire vehicle is operating properly. The techniques described herein solve these problems so that an entire vehicle response to a fault may be determined, instead of just how a single component or system responded. Additionally, the techniques described herein further improve the testing of vehicle component and/or system software by injecting hardware faults. In this way, and because component/system software is largely under test in simulations, the response of the software to an actual hardware fault may be verified, rather than simulating a hardware fault using software.

The techniques of this disclosure further improve the safety of an autonomous vehicle by testing the autonomous vehicle system as a whole before deploying the autonomous vehicle into a real-world scenario. For instance, by simulating faults associated with components of the autonomous vehicle to determine an overall reaction of the autonomous vehicle as a whole (e.g., causing a steering system fault and determining whether the autonomous vehicle properly performed a safe stop trajectory in response), the safety of operating autonomous vehicles in a real-world environment can be improved.

Furthermore, the techniques described herein allow for the testing of complex vehicle systems. For instance, vehicles that may be tested using the techniques disclosed may include several different and complex systems, subsystems, components, etc. By way of example, and not limitation, a vehicle under test may include a first steering system and a second, redundant steering system. Each of these steering systems may include various components that can be used to perform actions to compensate for components of the other steering system. That is, a first component of the first steering system may activate to perform an action to compensate for a failure or fault associated with a second component of the first steering system or the second steering system. The techniques of this disclosure allow for direct and intentional testing of these types of components of these complex vehicle systems that may not otherwise be possible using other techniques. These and other improvements will be readily apparent to those having skill in the art.

By way of example, and not limitation, the techniques described herein may include receiving, at a computing device, an indication to simulate a fault associated with a component that is configured for use in a vehicle. The fault may be associated with, for instance, a communication failure associated with the component, a hardware failure associated with the component, a software failure associated with the component, and/or the like. In some examples, the computing device may be a simulation or test controller that is running the simulation. The computing device may be executing an instance of an application programming interface (API) such that a user or test administrator may interact with the computing device to control the simulation. For instance, the indication to simulate the fault may be received via the API, and the user or test administrator may have issued the indication via a human-to-machine interface (HMI). In at least one example, the component of the vehicle may be an ECU of the vehicle that is configured to control, for instance, a drivetrain of the vehicle, a steering system of the vehicle, a brake system of the vehicle, and the like.

In some examples, the techniques may include causing, by the computing device and based at least in part on the indication, a control line to simulate the fault associated with the component. For instance, the computing device may be communicatively coupled to various components of the vehicle via control lines, and the computing device may use the control lines to simulate faults. For instance, the control line that is connected to the component may include a relay or switching component that the computing device activates to simulate the fault. In at least one example, the control line may include a first channel and a second channel, the first channel associated with an operational state of the component and the second channel associated with the fault, and causing the control line to simulate the fault includes causing the relay component of the control line to switch from the first channel to the second channel. That is, when the relay component is in a steady or normal state, the component may be communicatively coupled via the first channel to a vehicle computing device that controls operation of the vehicle. However, when the relay component is activated, the relay component may disconnect the component from the vehicle computing device to simulate the fault by switching from the first channel to the second channel. Additionally, when the component is disconnected from the vehicle computing device, either one of the vehicle computing device or the component is simultaneously connected to the computing device running the simulation to maintain the integrity of the software build of the vehicle computing device or the component.

The techniques may also include, in some instances, receiving data indicative of a measured trajectory associated with the vehicle. The measured trajectory may be associated with the response of the vehicle to the fault. Additionally, the measured trajectory may be a measured trajectory of a simulated vehicle representing the real vehicle components that are being tested. In some such examples, feedback from the sensors associated with the dyno may be used to control the vehicle in simulation to determine the trajectory. In other examples, the trajectory may be calculated (determined) from the sensor data itself. The data may be received by the computing device and the computing device may determine the measured trajectory of the vehicle based at least in part on the data. In at least one example, the data may be received from a dynamometer that is coupled to a motor or drivetrain component for use in the vehicle. As such, the data may include torque or speed measurements that the computing device uses to determine the measured trajectory. In additional or alternative examples, the received data may be indicative of a steering or wheel angle of the vehicle, and the data may be used to determine a lateral movement associated with the vehicle in response to the fault (e.g., how much the vehicle veered to the left or right). As yet another additional or alternative example, the received data may be indicative of brake pressure exerted by a brake system of the vehicle associated with at least one of decelerating the vehicle and/or stopping the vehicle in response to the fault. In some examples, the received data may be first data and the method may further include receiving, at the computing device and from a second component of the vehicle, second data indicative of a response of the second component of the vehicle based at least in part on the fault. In some instances, wheel odometry data may be received that is associated with a wheel component for use in the real vehicle.

In some examples, the techniques may include receiving and/or determining an intended trajectory of the vehicle associated with the vehicle response to the fault. For example, the computing device may receive an intended trajectory of the vehicle based at least in part on detecting the fault. In at least one example, the intended trajectory of the vehicle is received from the vehicle computing device. In some examples, the computing device may determine a difference between the measured trajectory and the intended trajectory. For instance, if the intended trajectory of the vehicle is associated with stopping the vehicle 10 meters from detecting the fault and with no lateral movement left or right, and the measured trajectory indicates that the vehicle stopped 12 meters from detecting the fault with a lateral movement to the right of 1 meter, then the computing device may determine that the measured trajectory is 2 meters long and 1 meter right of the intended trajectory. In some examples, the intended trajectory and/or the measured trajectory may include acceleration, velocity, and/or torque components, in addition to position components. That is, a "trajectory" as used herein may include components of position, direction, velocity, acceleration, and/or torque.

In some examples, the techniques may include causing presentation, by the computing device, of information associated with the vehicle response to the fault. In at least one example, the vehicle computing device may cause presentation of the information using the API such that the information may be displayed on the HMI. In various examples, the information may be indicative of a difference between the measured trajectory of the vehicle and the intended trajectory of the vehicle relative to a threshold difference. For instance, continuing the example above, if the threshold difference between a final stopping point associated with the measured trajectory and an intended trajectory is less than a threshold distance (in one or more dimensions), then the information may indicate that a vehicle system successfully completed a test.

In some examples, the component that the simulated fault is associated with may be a first component and the vehicle response to the fault may include activating a second component of the vehicle to perform an action previously performed by the first component. As such, the information presented by the computing device may be further indicative of a reaction time associated with activating the second component of the vehicle to perform the action based at least in part on the fault.

In some examples, the computing device (e.g., simulation controller) and/or the vehicle computing device may execute a tracker component during a simulation to traverse a simulated road network. In some examples, the tracker component may send commands to a vehicle controller to cause the vehicle to traverse the simulated road network. The commands may include, in some examples, commands to cause the autonomous vehicle to accelerate, decelerate, steer laterally, turn, etc. such that the autonomous vehicle may traverse the simulated road network.

In at least one example, in addition to (or instead of) injecting a fault into the vehicle system, an object may be injected into the simulation based on sensor data (e.g., perception data), and the vehicle response may be measured or determined. For instance, a pedestrian running in front of the vehicle may be injected into the simulation to determine the vehicle's response. Additional techniques associated with injecting objects into simulations are described in U.S. patent application Ser. No. 15/694,097 which is incorporated herein by reference in its entirety and for all purposes.

The techniques described herein can be implemented in a number of ways. Example implementations are provided below with reference to the following figures. Although discussed in the context of an autonomous vehicle, the techniques described herein can be applied to a variety of complex systems and is not limited to autonomous vehicles. For instance, the systems, methods, and apparatuses can be used in an aviation or in a nautical context to analyze aircraft or vessel responses to simulated faults and determine whether the aircraft or vessel performed its intended operations in response to the fault.

FIG. 1 illustrates an example data flow 100 that is associated with simulating a fault of a vehicle component according to some of the techniques described herein. The computing device(s) 102 may control a simulation of the vehicle 104. For instance, the computing device(s) 102 may initiate a simulation in which a simulated vehicle 120 representing the vehicle 104 is to traverse a simulated environment 106. In other words, the vehicle 104 may be a real vehicle, and the vehicle 104 or components for use in the real vehicle may control the operation/behavior of the simulated vehicle 120 in the simulated environment 106. The simulated environment 106 may include a simulated road network 108 that the simulated vehicle 120 is to navigate. Additionally, the simulated environment 106 may include one or more objects, such as other vehicles, pedestrians, buildings, structures, animals, trees, and the like.

During a simulation, the computing device(s) 102 may receive simulated sensor data 110 associated with the vehicle 104 that is controlling the simulated vehicle 120 while the simulated vehicle 120 traverses the simulated environment 106. The sensor data 110 may include motion data, vehicle component data, or other sensor data associated with the vehicle 104 in simulation. In some examples, the sensor data 110 may be captured by sensors of the vehicle 104 and/or sensors associated with the simulation system. For instance, the sensor data 110 may include motion data associated with a speed of the vehicle 104, a torque output of a motor of the vehicle 104, wheel odometry data, a direction of travel of the vehicle 104, and the like. The sensor data 110 may be received from a dynamometer that is coupled to a motor of the vehicle 104. In some instances, the dynamometer may be coupled to the motor of the vehicle 104 via one or more drivetrain component(s), such as a wheel, driveline, axle, hub, and/or the like. Additionally, or alternatively, the sensor data 110 may include vehicle component data associated with a component of the vehicle 104, such as a steering system component, brake system component, drivetrain system component, and the like. In at least one example, the sensor data 110 may be indicative of brake pressure(s) applied by a braking system of the vehicle 104 to perform a stopping or decelerating maneuver.

The computing device(s) 102 may further cause a simulated component fault 112 to be applied to the vehicle 104 during a simulation. For instance, the computing device(s) 102 may cause a component of the vehicle 104 to simulate a fault by, for instance, causing the component to be disconnected from a computing device or controller of the vehicle 104. In at least one example, the computing device(s) 102 may be communicatively coupled to the component of the vehicle 104 via a control line that includes a relay component, and the computing device(s) 102 may cause the relay component of the control line to activate such that the component of the vehicle 104 loses connection with the vehicle computing device and/or other components of the vehicle 104. In some examples, each component of the vehicle 104 that is to be configured to simulate faults may be communicatively coupled to the computing device(s) 102 via their own respective control line. In this way, multiple faults associated with multiple components of the vehicle 104 may be injected into the vehicle system if desired. For instance, a driving system fault and a braking system fault may be injected into the vehicle 104 simultaneously or in turn.

Because the computing device(s) 102 may continuously receive sensor data 110 from the vehicle 104 during a simulation, when a fault is injected into the vehicle 104, the sensor data 110 received during and/or after injection of the fault may be indicative of a response of the vehicle 104 to the fault, as well as responses of individual components and systems of the vehicle 104 in response to the fault. Furthermore, the behavior of the simulate vehicle 120 in the simulated environment 106 in response to the fault may be indicative of the real-world response of the vehicle 104 if the vehicle 104 were actually traversing a real-world environment represented by the simulated environment 106. Based at least in part on the sensor data 110, the computing device(s) 102 may determine and/or generate vehicle response data 114. The vehicle response data 114 may represent the response of the vehicle 104 to the fault, as well as the response of the vehicle components and/or systems. As shown, the vehicle response data 114 can be indicative of an intended trajectory 116 of the simulated vehicle 120 representing the vehicle 104, a measured trajectory 118 of the simulated vehicle 120, as well as a difference between the intended trajectory 116 and the measured trajectory 118. Additionally, the vehicle response data 114 can be fed back to the vehicle 104 to update the position or trajectory of the simulated vehicle 120 in the simulated environment 106.

By way of example, and not limitation, when the computing device(s) 102 inject the simulated component fault 112 into the vehicle 104, the vehicle 104 (or a controller, component, computing device, etc. of the vehicle 104) may detect the fault and perform one or more actions in response to the fault. The actions may include one or more of causing another component of the vehicle 104 to activate in place of the faulty component, causing the vehicle 104 to perform a safe, stopping maneuver, causing the vehicle to steer or merge to a safe location, and/or the like. As such, sensor data 110 may be received by the computing device(s) 102 that is associated with these actions of the vehicle 104 in response to the fault, and this sensor data 110 may then be used to determine the measured trajectory 118 of the simulated vehicle 120 representing the vehicle 104. The measured trajectory 118 of the vehicle 104 may be indicative of the entire response of the vehicle 104 as a whole. Additionally, the computing device(s) 102 may receive an indication of, or otherwise determine, the intended trajectory 116 of the vehicle 104, and this may be compared with the measured trajectory 118 relative to a threshold to verify whether the response of the vehicle 104 is acceptable, safe, correct, etc. The vehicle response data 114 may then be fed back to the vehicle 104 and/or a dynamometer used for testing the vehicle 104 to close the loop of the simulation.

Figure 2:
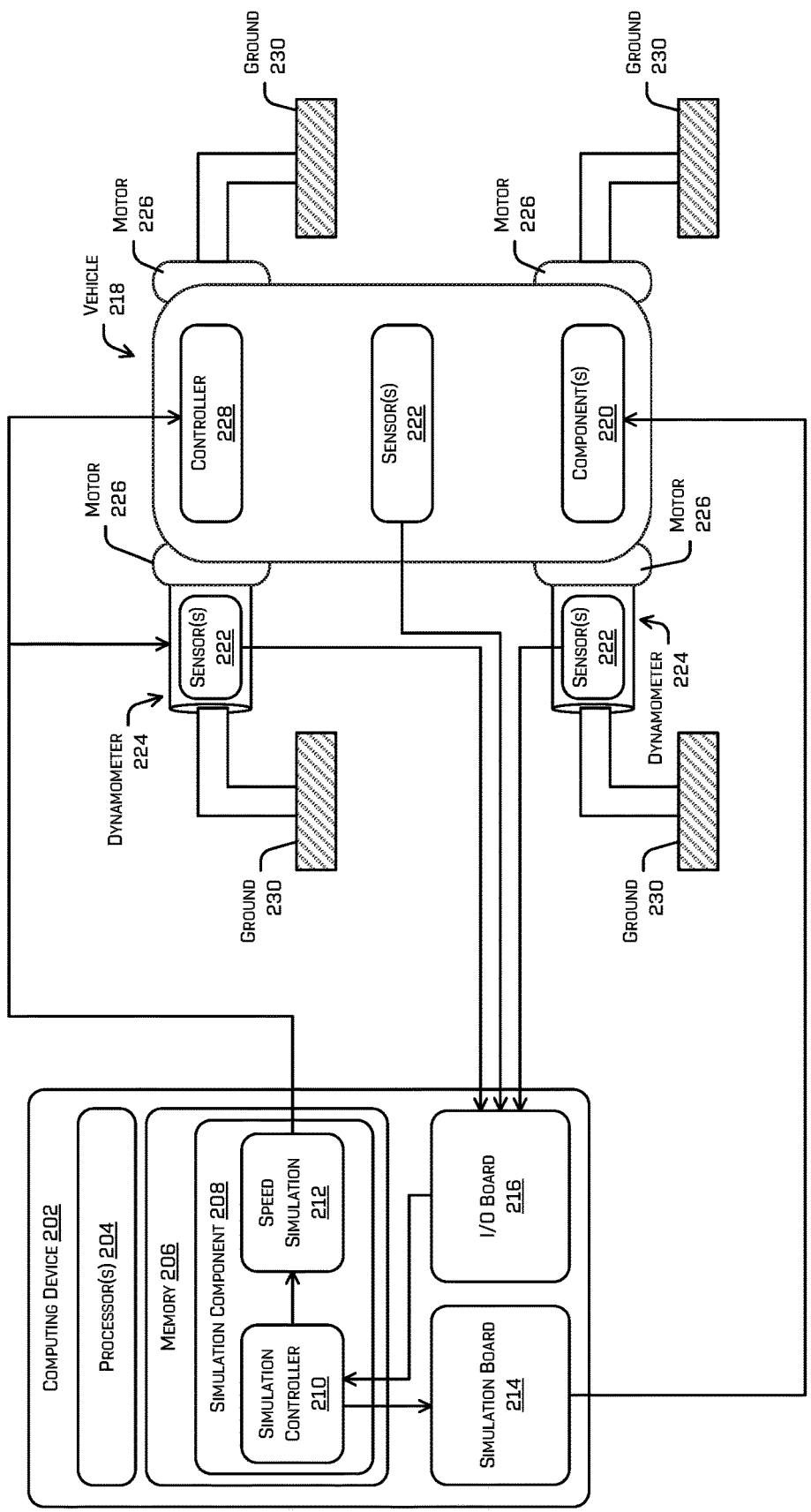
FIG. 2 is a system diagram illustrating an example architecture for simulating faults associated with vehicle components.

FIG. 2 is a system diagram illustrating an example architecture 200 for simulating faults associated with vehicle components. The computing device 202 may be similar to the computing device(s) 102 described with reference to FIG. 1. The computing device 202 may include one or more processor(s) 204 and memory 206 that is communicatively coupled to the one or more processors. In various examples, the memory 206 may store instructions that, when executed by the one or more processor(s) 204, cause the one or more processor(s) 204 to perform some of the techniques described herein for simulating faults of vehicle components and/or analyzing a vehicle response to faults. The computing device 202 may also include a simulation board 214 and an input/output (I/O) board 216. The memory 206 of the computing device 202 may store a simulation component 208. The simulation component 208 may include a simulation controller 210 and a speed simulation component 212.

The simulation board 214 of the computing device 202 may receive inputs from the simulation controller 210 and send outputs to the component(s) 220 of the vehicle 218 (which may be similar to the vehicle 104 described with reference to FIG. 1). For instance, the simulation controller 210 may send digital inputs to the simulation board 214, and the simulation board may generate analog outputs based on the digital inputs and send those analog outputs to the component(s) 220. For example, an analog output may cause a relay component of a control line to activate to simulate a fault associated with one or more of the component(s) 220 of the vehicle 218.

The I/O board 216 of the computing device 202 may, among other things, receive raw, analog sensor data from the sensor(s) 222, process the analog sensor data into digital data, and forward the digital data to the simulation controller 210. For example, the I/O board 216 may receive analog sensor data from the sensor(s) 222 of the dynamometers 224, process the analog sensor data to determine a torque value represented by the analog sensor data, and forward the torque value to the simulation controller 210. The torque value may represent an amount of torque being output by the motors 226 of the vehicle 218. As another example, the I/O board 216 may receive analog sensor data from the sensor(s) 222 of the vehicle 218, process the analog sensor data to determine brake pressure value(s) applied by one or more calipers of a braking system of the vehicle 218, and forward the brake pressure value(s) to the simulation controller 210.

The speed simulation component 212 may send measured speed signals to the controller 228 of the vehicle 218 and the dynamometer(s) 224. For instance, the simulation controller 210 may send torque values to the speed simulation component 212, and the speed simulation component 212 may determine a speed of the vehicle 218 and send an indication of the speed to the controller 228 and/or the dyno(s) 224. The controller 228 may be a low-level controller that translates trajectories into signals to be used by motor(s) of the vehicle 218.

The vehicle 218 may include one or more motors 226. The motors 226 may be coupled to a dynamometer 224 that includes sensor(s) 222 for capturing data representing a torque output of the motors 226. Additionally, the dynamometers 224 and/or the motors 226 may be connected to a physical ground 230 such that the vehicle 218 and the dynamometers 224 remain stationary even if the motors 226 or other drivetrain components connected to the motors 226 are in motion.

Figure 3:
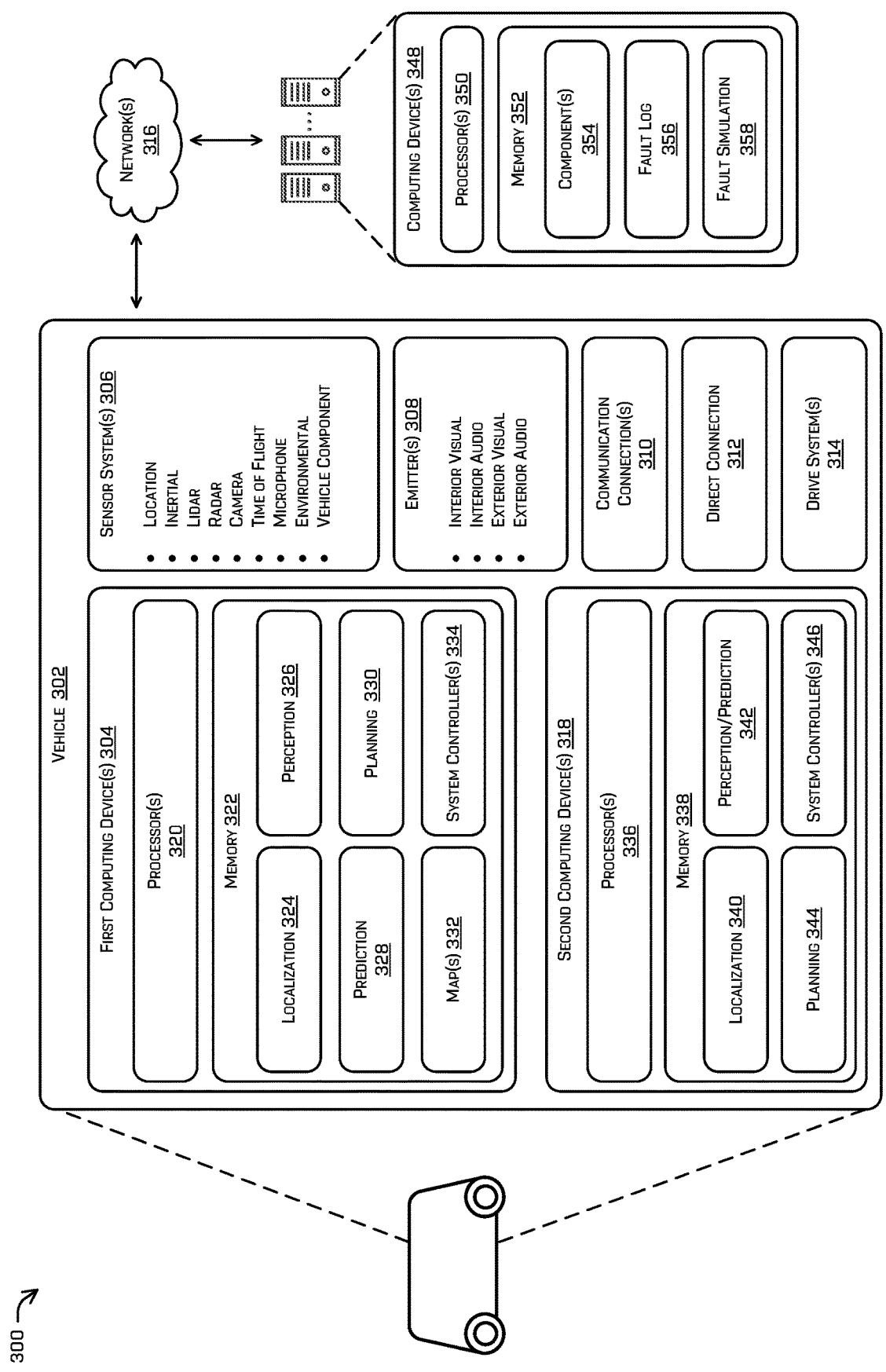
FIG. 3 is a block diagram illustrating example detail of a vehicle that may be used to implement some of the various technologies described herein.

FIG. 3 is a block diagram illustrating example detail of a vehicle that may be used to implement some of the various technologies described herein. In at least one example, the system 300 can include a vehicle 302. In the illustrated example system 300, the vehicle 302 is an autonomous vehicle; however, the vehicle 302 can be any other type of vehicle. The vehicle 302 may be similar to, or the same as, the vehicles 104 and 218 described above with respect to FIGS. 1 and 2.

The vehicle 302 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 302 can be configured to control all functions from start to completion of the trip, including all parking functions, it may not include a driver and/or controls for driving the vehicle 302, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 302 can include one or more first computing devices 304, one or more sensor systems 306, one or more emitters 308, one or more communication connections 310 (also referred to as communication devices and/or modems), at least one direct connection 312 (e.g., for physically coupling with the vehicle 302 to exchange data and/or to provide power), and one or more drive systems 314. The one or more sensor systems 306 can be configured to capture sensor data associated with an environment in which the vehicle 302 is operating, as well as sensor data associated with components of the vehicle 302 (e.g., components of the drive system(s) 314).

The sensor system(s) 306 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, pressure sensors, speed sensors, etc. The sensor system(s) 306 can include multiple instances of each of these or other types of sensors. For instance, the time-of-flight sensors can include individual time-of-flight sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the first computing device(s) 304.

The vehicle 302 can also include emitter(s) 308 for emitting light and/or sound. The emitter(s) 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 302 can also include communication connection(s) 310 that enable communication between the vehicle 302 and one or more other local or remote computing device(s) (e.g., a remote teleoperation computing device) or remote services. For instance, the communication connection(s) 310 can facilitate communication with other local computing device(s) on the vehicle 302 and/or the drive system(s) 314. Also, the communication connection(s) 310 can allow the vehicle 302 to communicate with other nearby computing device(s) (e.g., other nearby vehicles, traffic signals, etc.). The communication connection(s) 310 may be used for the vehicle 302 to send data to a simulation controller as described herein.

The communications connection(s) 310 can include physical and/or logical interfaces for connecting the first computing device(s) 304 to another computing device or one or more external networks 316 (e.g., the Internet). For example, the communications connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 302 can include drive system(s) 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include the sensor system(s) 306 to detect conditions of the drive system(s) 314 and/or the surroundings of the vehicle 302. By way of example and not limitation, the sensor system(s) 306 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, pressure sensors, etc. Some sensors, such as the wheel encoders can be unique to the drive system(s) 314. In some cases, the sensor system(s) 306 on the drive system(s) 314 can overlap or supplement corresponding systems of the vehicle 302 (e.g., sensor system(s) 306).

The drive system(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive system controller which can receive and preprocess data from the sensor system(s) 306 and to control operation of the various vehicle systems. In some examples, the drive system controller can include one or more processor(s) and memory communicatively coupled with the one or more processor(s). The memory can store one or more components to perform various functionalities of the drive system(s) 314. Furthermore, the drive system(s) 314 also include one or more communication connection(s) that enable communication by the respective drive system with one or more other local or remote computing device(s).

The vehicle 302 can include one or more second computing devices 318 to provide redundancy, error checking, and/or validation of determinations and/or commands determined by the first computing device(s) 304.

By way of example, the first computing device(s) 304 may be considered to be a primary system, while the second computing device(s) 318 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system, such as an injected fault as described herein. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

The first computing device(s) 304 can include one or more processors 320 and memory 322 communicatively coupled with the one or more processors 320. In the illustrated example, the memory 322 of the first computing device(s) 304 stores a localization component 324, a perception component 326, a prediction component 328, a planning component 330, a maps component 332, and one or more system controllers 334. Though depicted as residing in the memory 322 for illustrative purposes, it is contemplated that the localization component 324, the perception component 326, the prediction component 328, the planning component 330, the maps component 332, and the one or more system controllers 334 can additionally, or alternatively, be accessible to the first computing device(s) 304 (e.g., stored in a different component of vehicle 302 and/or be accessible to the vehicle 302 (e.g., stored remotely).

In memory 322 of the first computing device 304, the localization component 324 can include functionality to receive data from the sensor system(s) 306 to determine a position of the vehicle 302. For example, the localization component 324 can include and/or request/receive a three-dimensional map of an environment and can continuously determine a location of the autonomous vehicle within the map. In some instances, the localization component 324 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 324 can provide data to various components of the vehicle 302 to determine an initial position of an autonomous vehicle for generating a trajectory, as discussed herein. In at least one example, the localization component 324 may determine a location or position of the vehicle 302 in a simulated environment associated with a simulation.

The perception component 326 can include functionality to perform object detection, segmentation, and/or classification. In some examples, the perception component 326 can provide processed sensor data that indicates a presence of an entity that is proximate to the vehicle 302 and/or a classification of the entity as an entity type (e.g., car, pedestrian, cyclist, building, tree, road surface, curb, sidewalk, unknown, etc.). In additional or alternative examples, the perception component 326 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 326 can use perception algorithms to determine a perception-based bounding box associated with an object in the environment based on sensor data. For example, the perception component 326 can receive image data and classify the image data to determine that an object is represented in the image data. Then, using detection algorithms, the perception component 326 can generate a two-dimensional bounding box and/or a perception-based three-dimensional bounding box associated with the object. The perception component 326 can further generate a three-dimensional bounding box associated with the object. As discussed above, the three-dimensional bounding box can provide additional information such as a location, orientation, pose, and/or size (e.g., length, width, height, etc.) associated with the object.

The perception component 326 can include functionality to store perception data generated by the perception component 326. In some instances, the perception component 326 can determine a track corresponding to an object that has been classified as an object type. For purposes of illustration only, the perception component 326, using sensor system(s) 306 can capture one or more images of an environment. The sensor system(s) 306 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 302. Fused perception data can include a fusion or other combination of sensor data from sensor system(s) 306, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 328 can generate one or more probability maps representing prediction probabilities of possible locations of one or more objects in an environment. For example, the prediction component 328 can generate one or more probability maps for vehicles, pedestrians, animals, and the like within a threshold distance from the vehicle 302. In some instances, the prediction component 328 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 330 can determine a path for the vehicle 302 to follow to traverse through an environment. For example, the planning component 330 can determine various routes and paths and various levels of detail. In some instances, the planning component 330 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 330 can generate an instruction for guiding the autonomous vehicle along at least a portion of the route from the first location to the second location. In at least one example, the planning component 330 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 330 can alternatively, or additionally, use data from the perception component 326 and/or the prediction component 328 to determine a path for the vehicle 302 to follow to traverse through an environment. For example, the planning component 330 can receive data from the perception component 326 and/or the prediction component 328 regarding objects associated with an environment. Using this data, the planning component 330 can determine a route to travel from a first location (e.g., a current location) to a second location (e.g., a target location) to avoid objects in an environment. In at least some examples, such a planning component 330 may determine there is no such collision free path and, in turn, provide a path which brings vehicle 302 to a safe stop avoiding all collisions and/or otherwise mitigating damage. In at least one example, the planning component 330 may determine an intended trajectory for the vehicle 302 to follow based at least in part on an injected fault.

The memory 322 can further include one or more maps 332 that can be used by the vehicle 302 to navigate within an environment, including a simulated environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 332 can include at least one map (e.g., images and/or a mesh). In some examples, the vehicle 302 can be controlled based at least in part on the map(s) 332. That is, the map(s) 332 can be used in connection with the localization component 324, the perception component 326, the prediction component 328, and/or the planning component 330 to determine a location of the vehicle 302, identify objects in an environment, generate prediction probabilit(ies) associated with objects and/or the vehicle 302, and/or generate routes and/or trajectories to navigate within an environment.

In some examples, the one or more maps 332 can be stored on a remote computing device(s) (such as the computing device(s) 348) accessible via network(s) 316. In some examples, multiple maps 332 can be stored based on, for example, a characteristic (e.g., type of entity, time of day, day of week, season of the year, etc.). Storing multiple maps 332 can have similar memory requirements but can increase the speed at which data in a map can be accessed.

In at least one example, the first computing device(s) 304 can include one or more system controller(s) 334, which can be configured to control steering, propulsion, braking, safety, emitters, communication, and other systems of the vehicle 302. These system controller(s) 334 can communicate with and/or control corresponding systems of the drive system(s) 314 and/or other components of the vehicle 302, which may be configured to operate in accordance with a path provided from the planning component 330.

The second computing device(s) 318 can comprise one or more processors 336 and memory 338 including components to verify and/or control aspects of the vehicle 302, as discussed herein. In at least one instance, the one or more processors 336 can be similar to the processor(s) 320 and the memory 338 can be similar to the memory 322. However, in some examples, the processor(s) 336 and the memory 338 may comprise different hardware than the processor(s) 320 and the memory 322 for additional redundancy.

In some examples, the memory 338 can comprise a localization component 340, a perception/prediction component 342, a planning component 344, and one or more system controllers 346.

In some examples, the localization component 340 may receive sensor data from the sensor(s) 306 to determine one or more of a position and/or orientation (together a pose) of the autonomous vehicle 302. Here, the position and/or orientation may be relative to point(s) and/or object(s) in an environment in which the autonomous vehicle 302 is located. In examples, the orientation may include an indication of a yaw, roll, and/or pitch of the autonomous vehicle 302 relative to a reference plane and/or relative to point(s) and/or object(s). In examples, the localization component 340 may perform less processing than the localization component 324 of the first computing device(s) 304 (e.g., higher-level localization). For instance, the localization component 340 may not determine a pose of the autonomous vehicle 302 relative to a map, but merely determine a pose of the autonomous vehicle 302 relative to objects and/or surfaces that are detected around the autonomous vehicle 302 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception/prediction component 342 can include functionality to detect, identify, classify, and/or track object(s) represented in sensor data. For example, the perception/prediction component 342 can perform the clustering operations and operations to estimate or determine a height associated with objects, as discussed herein.

In some examples, the perception/prediction component 342 may comprise an M-estimator, but may lack an object classifier such as, for example, a neural network, decision tree, and/or the like for classifying objects. In additional or alternate examples, the perception/prediction component 342 may comprise an ML model of any type, configured to disambiguate classifications of objects. By contrast, the perception component 326 may comprise a pipeline of hardware and/or software components, which may comprise one or more machine-learning models, Bayesian filters (e.g., Kalman filters), graphics processing unit(s) (GPU(s)), and/ or the like. In some examples, the perception data determined by the perception/prediction component 342 (and/or 326) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/ or heading), and/or the like.

The perception/prediction component 342 may also process the input data to determine one or more predicted trajectories for an object. For example, based on a current position of an object and a velocity of the object over a period of a few seconds, the perception/prediction component 342 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 344 can include functionality to receive a trajectory from the planning component 330 to validate that the trajectory is free of collisions and/or is within safety margins. In some examples, the planning component 344 can generate a safe stop trajectory (e.g., a trajectory to stop the vehicle 302 with a "comfortable" deacceleration (e.g., less than maximum deceleration)) and in some examples the planning component 344 can generate an emergency stop trajectory (e.g., maximum deceleration with or without steering inputs).

In some examples, the system controller(s) 346 can include functionality to control safety critical components (e.g., steering, braking, motors, etc.) of the vehicle. In this manner, the second computing device(s) 318 can provide redundancy and/or an additional hardware and software layer for vehicle safety.

The vehicle 302 can connect to computing device(s) 348 via one or more network(s) 316 and can include one or more processors 350 and memory 352 communicatively coupled with the one or more processors 350. In at least one instance, the one or more processors 350 can be similar to the processor(s) 320 and the memory 352 can be similar to the memory 322. In the illustrated example, the memory 352 of the computing device(s) 348 stores a component(s) 354, which may correspond to any of the components discussed herein, as well as a fault log 356 and a fault simulation component 358.

The fault log 356 may store data associated with one or more simulated faults injected into the vehicle 302. For instance, the fault log 356 may store sensor data associated with the vehicle 302 that was captured during or after an injected fault. The fault simulation component 358 may include functionality to inject simulated faults into the vehicle 302. For instance, the fault simulation component 358 may include functionality to simulate a fault with respect to a brake system of the vehicle 302, a steering system of the vehicle 302, or any components or systems of the drive system(s) 314 of the vehicle 302. In at least one example, data stored in the fault log 356 may be used to generate faults based on previously observed faults in a real-world driving scenario so that the vehicle system may be tested to see if the fault can be overcome. For instance, new or updated code may be pushed to a controller or component of the vehicle and, if the fault is overcome and the code is validated, the code may be pushed to a real vehicle for driving. In this way, if the real vehicle experiences the fault, the real vehicle should be able to overcome the fault.

The processor(s) 320, 336, and/or 350 can be any suitable processor capable of executing instructions to process data and perform operations as described herein. By way of example and not limitation, the processor(s) 320, 336, and/or 350 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 322, 338, and/or 352 are examples of non-transitory computer-readable media. The memory 322, 338, and/or 352 can store an operating system and one or more software applications, instructions, programs, and/or data to implement the methods described herein and the functions attributed to the various systems. In various implementations, the memory 322, 338, and/or 352 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 322, 338, and/or 352 can be implemented as a neural network. In some examples, the components in the memory 322, 338, and/or 352 may not include machine learning algorithm to reduce complexity and to be verified and/or certified from a safety standpoint.

As described herein, an exemplary neural network is an algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Accordingly, the techniques discussed herein provide a robust implementation for simulating vehicle component faults such that an entire vehicle response may be determined, analyzed, and/or verified.

Figure 4:
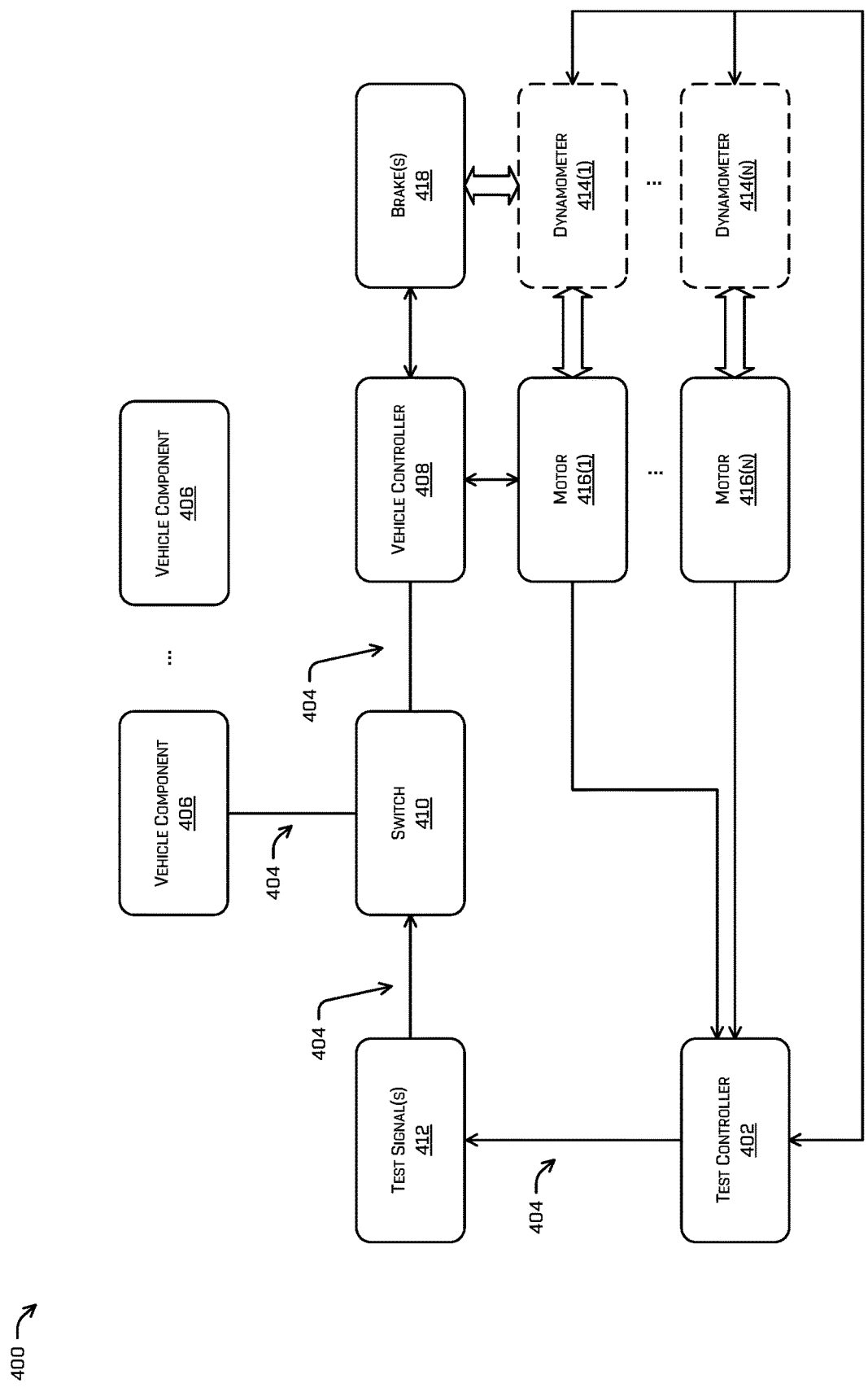
FIG. 4 illustrates another example architecture for simulating faults associated with vehicle components.

FIG. 4 illustrates another example architecture 400 for simulating faults associated with vehicle components. The architecture 400 includes a test controller 402, control line(s) 404 that may communicatively couple the test controller 402 with one or more vehicle components 406 and/or a vehicle controller 408. The control line(s) 404 may include a switch 410 (e.g., relay) so that test signal(s) 412 may be sent to the vehicle component 406 or the vehicle controller 408. For instance, a test signal 412 may be sent to the vehicle controller 408 to simulate a fault associated with one of the vehicle components 406, or a vehicle component 406 may be disconnected via the switch 410 to simulate a fault or error. In some examples, the API described herein may be executing on the test controller 402.

In various examples, the architecture 400 may also include one or more dynamometers 414(1) and 414(N) (hereinafter referred to collectively as "dynamometers 414") (where N represents any number greater than or equal to one). The dynamometers 414 may be coupled to one or more motors 416(1) and 416(2) of the vehicle (hereinafter referred to collectively as "motors 416") (where N represents any number greater than or equal to one). Additionally, brake(s) 418 for decelerating the motor(s) 416 may be coupled to the dynamometers 414 and/or the motors 416. For instance, the dynamometers 414 may be coupled to the motors 416 via a driveshaft of the motor, an axle of the vehicle, a driveline of the vehicle, a wheel hub of the vehicle, and/or the like such that the dynamometers may 414 may determine and/or measure mechanical torque output by the motors 416 in real time. The dynamometers 414 may be in communication with the test controller 402. In some instances, torque data or other motor output data captured by the dynamometers 414 may be input into the test controller 402 such that the test controller 402 may determine a measured velocity, acceleration, speed, torque, and/or the like of the vehicle. Additionally, in some examples, the test controller 402 may receive data directly from the motors 416 associated with the velocity, acceleration, speed, torque, and/or the like of the vehicle. In at least one example, the test controller 402 feeds back speed data associated with the motors 416 and/or the vehicle into the dynamometers 414.

In some examples, the vehicle components 406 may comprise a low-level controller of the vehicle that is configured to monitor and/or control operation of a drive module of the vehicle. A drive module of the vehicle may include various components such as, for example, the motor 416(1), a battery, wheel(s), driveline(s), axle(s), a brake system, gearbox, a steering system, and the like. The vehicle controller 408, in some examples, may comprise an ECU or other controller for controlling one or more of the various components of the drive module. For instance, the vehicle controller 408 may control the brake system. Additionally, or alternatively, the vehicle controller 408 may control the wheels, the steering system, or any other components of the drive module of the vehicle, including components not described herein.

In some examples, the test signal(s) 412 may comprise CAN messages and/or signals. Additionally, the test signal(s) 412 may be configured to change a state of the switch 410 to simulate a fault or error. In various examples, an API may be executing on the test controller 402. Based at least in part on receiving an input via the API, the test controller 402 may send the test signal(s) 412.

Figure 5:
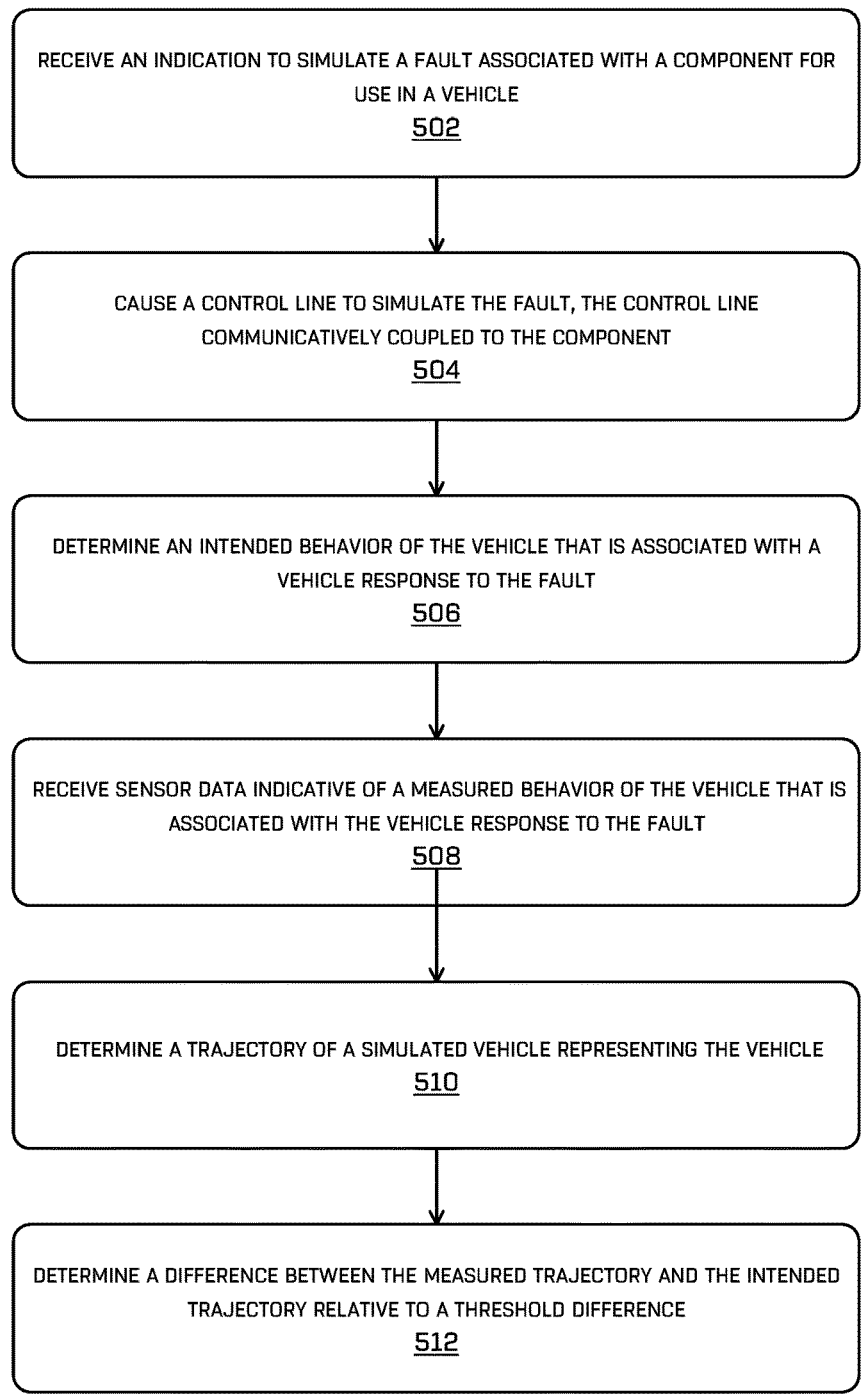
FIG. 5 is a flowchart illustrating an example method that may be performed at least in part by a computing device to simulate faults associated with components of a vehicle to verify a vehicle response.

FIG. 5 is a flowchart illustrating an example method that may be performed at least in part by a computing device to simulate faults associated with components of a vehicle to verify a vehicle response. The method 500 illustrated in FIG. 5 is described with reference to one or more of the vehicles and/or systems described in FIGS. 1-4 for convenience and ease of understanding. However, the method 500 illustrated in FIG. 5 is not limited to being performed using the vehicles, systems, and/or techniques described in FIGS. 1-4, and may be implemented using any of the other vehicles, systems, and technologies described in this application, as well as vehicles, systems, and technologies other than those described herein. Moreover, the vehicles, systems, and user interfaces described herein are not limited to performing the method 500 illustrated in FIG. 5.

The method 500 is illustrated as a collection of blocks in a logical flow graph, which represents sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some examples, one or more blocks of the process may be omitted entirely. Moreover, the method 500 may be combined in whole or in part with other methods described herein.

The method 500 begins at operation 502, which includes receiving an indication to simulate a fault associated with a component for use in a vehicle. For instance, the computing device(s) 102 may receive the indication to simulate the fault associated with a component of the vehicle 104. In some examples, the computing device(s) 102 may receive the indication to simulate the fault via an API that enables a user to interact with the computing device(s) 102 via an HMI.

At operation 504, the method 500 includes causing a control line to simulate the fault, the control line communicatively coupled to the component. For instance, the computing device(s) 102 may cause the control line to simulate the fault by disconnecting communication between the component and another component, system, controller, or computing device of the vehicle 104. In some instances, the control line may include a relay or switching component, such as the switch 410.

At operation 506, the method 500 includes determining an intended behavior of the vehicle that is associated with a vehicle response to the fault. For instance, the computing device(s) 102 may determine the intended trajectory 116 of the simulated vehicle 120 representing the vehicle 104. In some examples, the computing device(s) 102 may receive data indicative of the intended trajectory 116 from a planning component 330 and/or 334 of the vehicle.

At operation 508, the method 500 includes receiving sensor data indicative of a measured behavior of the vehicle that is associated with the vehicle response to the fault. For instance, the computing device(s) 102 may receive sensor data 110 associated with the vehicle 104. The sensor data 110 may have been captured or generated by a sensor 222 of a dynamometer 224 that is coupled to a motor or drivetrain component of the vehicle 104.

At operation 510, the method 500 includes determining a trajectory of a simulated vehicle representing the vehicle. For instance, based at least in part on the sensor data 110, the computing device(s) 102 or a computing device of the vehicle 104 may determine the measured trajectory 118 of the simulated vehicle 120 representing the vehicle 104 in response to the fault.

At operation 512, the method 500 includes determining a difference between the measured behavior and the intended behavior relative to a threshold difference. For instance, the computing device(s) 102 may determine the difference between the measured trajectory 118 and the intended trajectory 116 of the simulated vehicle 120 representing the vehicle 104. In some examples, the computing device(s) 102 may cause presentation of information associated with the response of the vehicle 104 to detecting the fault, and the information may include, among other things, whether the difference is less than the threshold difference, whether the vehicle 104 response to the fault meets, fails, or exceeds expectations, a delay associated with the vehicle 104 responding to the fault (e.g., how long it took the vehicle 104 to detect the fault), and the like. In some examples, based at least in part on the difference, the computing device(s) 102 may validate operation of software code associated with a component or controller of the vehicle 104 and transmit the validated code to a real vehicle of a fleet of vehicles such that the real vehicle can overcome the fault should the real vehicle experience the fault.

EXAMPLE CLAUSES

A. A system comprising: a dynamometer that is configured to couple to a drivetrain component associated with a vehicle; and a computing device that is communicatively coupled to components associated with the vehicle via control lines, the computing device comprising: one or more processors; and one or more non-transitory computer-readable media storing instructions that, when executed by the one or more processors, cause the computing device to perform operations comprising: receiving, via an application programming interface (API) that is executing on the computing device, an indication to simulate a fault associated with a first component; causing, based at least in part on the indication, a first control line to simulate the fault, the first control line communicatively coupled to the first component; determining an intended behavior associated with the vehicle in response to the fault; receiving, from the dynamometer, first data indicative of a measured behavior associated with the vehicle in response to the fault; determining a difference between the intended behavior and the measured behavior; and transmitting, based at least in part on the difference, second data associated with validating operation of a controller associated with the vehicle.

B. The system as recited in paragraph A, wherein the intended behavior is associated with at least one of stopping the vehicle, steering the vehicle, or activating a second component associated with the vehicle to perform an action to compensate for the fault associated with the first component.

C. The system as recited in any one of paragraphs A or B, the operations further comprising: receiving, from a second component associated with the vehicle, second data indicative of a response of the second component based at least in part on the fault; and based at least in part on the second data and the difference being less than a threshold difference, validating operation of at least one of the second component or the controller associated with the vehicle.

D. The system as recited in any one of paragraphs A-C, wherein the first component associated with the vehicle is a first low-level control unit that is configured to control at least one of the drivetrain component, a steering system associated with the vehicle, or a braking system associated with the vehicle.

E. A method comprising: receiving, by a computing device, an indication to simulate a fault associated with a first component for use in a real vehicle; causing, by the computing device and based at least in part on the indication, a control line to simulate the fault, the control line communicatively coupling the computing device to the first component; receiving, at the computing device, data associated with a second component in response to the fault, the second component for use in the real vehicle; determining, based at least in part on the data, a measured trajectory of a simulated vehicle in response to the fault, the simulated vehicle representing the real vehicle; and validating operation of the second component or the real vehicle based at least in part on a difference between the measured trajectory and an intended trajectory of the simulated vehicle in response to the fault.

F. The method as recited in paragraph E, wherein the data is torque data that is indicative of the measured trajectory of the simulated vehicle, the torque data received from a dynamometer that is coupled to the second component.

G. The method as recited in any one of paragraphs E or F, wherein the second component is activated in response to the fault to perform an action to compensate for the fault associated with the first component.

H. The method as recited in any one of paragraphs E-G, further comprising determining, based at least in part on the data, a reaction time associated with at least one of activating the second component or the second component performing the action.

I. The method as recited in any one of paragraphs E-H, wherein determining the measured trajectory of the simulated vehicle in response to the fault comprises: inputting the data into a controller for use in the real vehicle; and receiving, from the controller, the measured trajectory of the simulated vehicle.

J. The method as recited in any one of paragraphs E-I, wherein the first component is a first low level control unit for use in the real vehicle, the first low level control unit configured to control one of a drivetrain associated with the real vehicle, a steering system associated with the real vehicle, or a brake system associated with the real vehicle.

K. The method as recited in any one of paragraphs E-J, wherein the fault associated with the first component is at least one of a communication failure between the first component and a vehicle computing device, a simulated hardware failure associated with the first component, or a software failure associated with the first component.

L. The method as recited in any one of paragraphs E-K, wherein the intended trajectory is a safe stop trajectory and validating operation of the second component comprises determining whether the second component caused the simulated vehicle to stop using less than a maximum deceleration.

M. The method as recited in any one of paragraphs E-L, wherein: the control line includes a first channel and a second channel, the first channel associated with a nominal state of the first component and the second channel associated with a fault state, and causing the control line to simulate the fault comprises causing a relay component of the control line to switch from the first channel to the second channel.

N. The method as recited in any one of paragraphs E-M, wherein the first channel of the control line communicatively couples an output of the first component to a controller for use in the real vehicle and the second channel of the control line communicatively couples the controller to the computing device such that the computing device can inject a simulated fault to the controller that is associated with the first component.

O. One or more non-transitory computer-readable media storing computer-executable instructions that, when executed by one or more processors of a computing device, cause the computing device to perform operations comprising: receiving an indication to simulate a fault associated with a first component for use in a real vehicle; causing, based at least in part on the indication, a control line to simulate the fault, the control line communicatively coupling the computing device to the first component; receiving data associated with a second component in response to the fault, the second component for use in the real vehicle; determining, based at least in part on the data, a measured trajectory of a simulated vehicle in response to the fault, the simulated vehicle representing the real vehicle; and validating operation of the second component or the real vehicle based at least in part on a difference between the measured trajectory and an intended trajectory of the simulated vehicle in response to the fault.

P. The one or more non-transitory computer-readable media as recited in paragraph O, wherein the data is torque data that is indicative of the measured trajectory of the simulated vehicle, the torque data received from a dynamometer that is coupled to the second component.

Q. The one or more non-transitory computer-readable media as recited in any one of paragraphs O or P, wherein the second component is activated to perform an action to compensate for the fault associated with the first component.

R. The one or more non-transitory computer-readable media as recited in any one of paragraphs O-Q, wherein the first component of the vehicle is a low level control unit that is configured to control one of a drivetrain associated with the real vehicle, a steering system associated with the real vehicle, or a brake system associated with the real vehicle.

S. The one or more non-transitory computer-readable media as recited in any one of paragraphs O-R, wherein determining the measured trajectory of the simulated vehicle in response to the fault comprises: inputting the data into a controller for use in the real vehicle; and receiving, from the controller, the measured trajectory of the simulated vehicle.

T. The one or more non-transitory computer-readable media as recited in any one of paragraphs O-S, wherein: the control line includes a first channel and a second channel, the first channel associated with a nominal state of the first component and the second channel associated with a fault state, and causing the control line to simulate the fault comprises causing a switching component of the control line to switch from the first channel to the second channel.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   a dynamometer that is configured to couple to a drivetrain component associated with a vehicle; and
   a computing device that is communicatively coupled to components associated with the vehicle via control lines, the computing device comprising:
   one or more processors; and
   one or more non-transitory computer-readable media storing instructions that, when executed by the one or more processors, cause the computing device to perform operations comprising:
   receiving, via an application programming interface (API) that is executing on the computing device, an indication to simulate a fault associated with a first component associated with the vehicle;
   causing, based at least in part on the indication, a first control line to simulate the fault associated with the first component associated with the vehicle, the first control line communicatively coupled to the first component associated with the vehicle;
   determining, based at least in part on the fault associated with the first component associated with the vehicle, an intended vehicle response to the fault, the intended vehicle response to the fault defining a behavior of an entirety of the vehicle as limited by the first component associated with the vehicle and being associated with at least one of stopping the vehicle, steering the vehicle, or activating a second component associated with the vehicle to perform an action to compensate for the fault associated with the first component associated with the vehicle;
   receiving, from the dynamometer, first data indicative of a measured vehicle response to the fault;
   determining a difference between the intended vehicle response to the fault and the measured vehicle response to the fault; and
   transmitting, based at least in part on the difference, second data associated with validating operation of a controller associated with the vehicle.

2. The system of claim 1, wherein the second component is activated to perform an action previously performed by the first component.

3. The system of claim 1, the operations further comprising:
   receiving, from the second component associated with the vehicle, third data indicative of a response of the second component associated with the vehicle based at least in part on the fault associated with the first component associated with the vehicle; and
   based at least in part on the third data and the difference being less than a threshold difference, validating operation of at least one of the second component associated with the vehicle or the controller associated with the vehicle.

4. The system of claim 1, wherein the first component associated with the vehicle is a first low-level control unit that is configured to control at least one of the drivetrain component, a steering system associated with the vehicle, or a braking system associated with the vehicle.

5. A method comprising:
   receiving, by a computing device, an indication to simulate a fault associated with a first component for use in a real vehicle;
   causing, by the computing device and based at least in part on the indication, a control line to simulate the fault, the control line communicatively coupling the computing device to the first component;
   receiving, at the computing device and from a sensor communicatively coupled with a second component, data associated with a response of the second component to the fault, the data associated with at least one of stopping the real vehicle, steering the real vehicle, or activating the second component to compensate for the first component;
   wherein the second component is a physical component for use in the real vehicle;
   determining, based at least in part on the data, a measured trajectory of a simulated vehicle in response to the fault, the simulated vehicle representing the real vehicle; and
   validating operation of the second component or the real vehicle based at least in part on a difference between the measured trajectory and an intended trajectory of the simulated vehicle in response to the fault.

6. The method of claim 5, wherein the data is torque data that is indicative of the measured trajectory of the simulated vehicle, the torque data received from the sensor that is coupled to the second component, wherein the sensor is a dynamometer.

7. The method of claim 5, wherein the second component is activated in response to the fault to perform an action previously performed by the first component.

8. The method of claim 7, further comprising determining, based at least in part on the data, a reaction time associated with at least one of activating the second component or the second component performing the action.

9. The method of claim 5, wherein determining the measured trajectory of the simulated vehicle in response to the fault comprises:
   inputting the data into a controller for use in the real vehicle; and
   receiving, from the controller, the measured trajectory of the simulated vehicle.

10. The method of claim 5, wherein the first component is a first low level control unit for use in the real vehicle, the first low level control unit configured to control one of a drivetrain associated with the real vehicle, a steering system associated with the real vehicle, or a brake system associated with the real vehicle.

11. The method of claim 5, wherein the fault associated with the first component is at least one of a communication failure between the first component and a vehicle computing device, a simulated hardware failure associated with the first component, or a software failure associated with the first component.

12. The method of claim 5, wherein the intended trajectory is a safe stop trajectory and validating the operation of the second component comprises determining whether the second component caused the simulated vehicle to stop using less than a maximum deceleration.

13. The method of claim 5, wherein:
the control line includes a first channel and a second channel, the first channel associated with a nominal state of the first component and the second channel associated with a fault state, and
causing the control line to simulate the fault comprises causing a relay component of the control line to switch from the first channel to the second channel.

14. The method of claim 13, wherein the first channel of the control line communicatively couples an output of the first component to a controller for use in the real vehicle and the second channel of the control line communicatively couples the controller to the computing device such that the computing device can inject a simulated fault to the controller that is associated with the first component.

15. One or more non-transitory computer-readable media storing computer-executable instructions that, when executed by one or more processors of a computing device, cause the computing device to perform operations comprising:
receiving an indication to simulate a fault associated with a first component for use in a real vehicle;
causing, based at least in part on the indication, a control line to simulate the fault, the control line communicatively coupling the computing device to the first component;
receiving, from a sensor communicatively coupled with a second component, data associated with a response of the second component to the fault, the data associated with at least one of stopping the real vehicle, steering the real vehicle, or activating the second component to compensate for the first component;
wherein the second component is a physical component for use in the real vehicle;
determining, based at least in part on the data, a measured trajectory of a simulated vehicle in response to the fault, the simulated vehicle representing the real vehicle; and
validating operation of the second component or the real vehicle based at least in part on a difference between the measured trajectory and an intended trajectory of the simulated vehicle in response to the fault.

16. The one or more non-transitory computer-readable media of claim 15, wherein the data is torque data that is indicative of the measured trajectory of the simulated vehicle, the torque data received from the sensor that is coupled to the second component, wherein the sensor is a dynamometer.

17. The one or more non-transitory computer-readable media of claim 15, wherein the second component is activated to perform an action to compensate for the fault associated with the first component.

18. The one or more non-transitory computer-readable media of claim 15, wherein the first component of the real vehicle is a low level control unit that is configured to control one of a drivetrain associated with the real vehicle, a steering system associated with the real vehicle, or a brake system associated with the real vehicle.

19. The one or more non-transitory computer-readable media of claim 15, wherein determining the measured trajectory of the simulated vehicle in response to the fault comprises:
inputting the data into a controller for use in the real vehicle; and
receiving, from the controller, the measured trajectory of the simulated vehicle.

20. The one or more non-transitory computer-readable media of claim 15, wherein:
the control line includes a first channel and a second channel, the first channel associated with a nominal state of the first component and the second channel associated with a fault state, and
causing the control line to simulate the fault comprises causing a switching component of the control line to switch from the first channel to the second channel.

\* \* \* \* \*